United States Patent

Adamick

(10) Patent No.: US 9,637,324 B2
(45) Date of Patent: May 2, 2017

(54) REFUSE DISPOSING SYSTEM

(71) Applicant: Peggy Adamick, Pocahontas, IL (US)

(72) Inventor: Peggy Adamick, Pocahontas, IL (US)

( * ) Notice: Subject to any disclaimer, the term of this patent is extended or adjusted under 35 U.S.C. 154(b) by 160 days.

(21) Appl. No.: 14/549,222

(22) Filed: Nov. 20, 2014

(65) Prior Publication Data
US 2016/0145057 A1 May 26, 2016

(51) Int. Cl.
*B65G 53/40* (2006.01)
*B65G 51/02* (2006.01)
*B65F 1/10* (2006.01)

(52) U.S. Cl.
CPC .............. *B65G 51/02* (2013.01); *B65F 1/105* (2013.01)

(58) Field of Classification Search
CPC .......... B65G 51/02; B65F 1/0093; B65F 1/10; B65F 5/0055; E04F 17/10; E04F 17/12
USPC .................................................. 406/108, 144
See application file for complete search history.

(56) References Cited

U.S. PATENT DOCUMENTS

| | | | | |
|---|---|---|---|---|
| 321,573 A * | 7/1885 | Boschke | ................ | B65G 53/14 406/137 |
| 325,016 A * | 8/1885 | Ryan | ...................... | B65G 53/12 406/121 |
| 3,767,268 A * | 10/1973 | Stucky | ................... | B65G 53/00 119/844 |
| D243,256 S | 2/1977 | Grihalva | | |
| 4,240,769 A * | 12/1980 | Diaz | ...................... | B65G 51/06 406/108 |
| D296,834 S | 7/1988 | McDermott | | |
| 4,987,988 A | 1/1991 | Messina et al. | | |
| 5,083,704 A | 1/1992 | Rounthwaite | | |
| 5,492,227 A | 2/1996 | Millette et al. | | |
| 5,772,112 A | 6/1998 | Bulcroft | | |
| 5,806,759 A | 9/1998 | Axisa | | |
| 6,146,057 A * | 11/2000 | Gromley | ................ | B65G 51/26 406/10 |
| 6,729,808 B1 * | 5/2004 | Nelson | ................... | B65G 51/18 406/11 |
| 6,892,909 B1 * | 5/2005 | Hebert | ................... | A01C 7/081 111/174 |
| 7,080,961 B1 * | 7/2006 | Blatt | ...................... | A01C 15/04 406/122 |
| 7,624,485 B2 * | 12/2009 | Crandlemire | ......... | B05B 7/1445 222/637 |
| 8,474,591 B1 | 7/2013 | Coples | | |
| 8,523,051 B2 | 9/2013 | Clancy et al. | | |
| 8,622,660 B1 * | 1/2014 | Gore | .................... | A01K 5/0208 406/144 |

(Continued)

Primary Examiner — William R Harp

(57) ABSTRACT

A refuse disposing system includes a housing having a perimeter wall bounding an interior space. An inner conduit is positioned within the housing. The perimeter wall has an access opening therein in communication with the inner conduit and the inner conduit has an exit aperture extending through the perimeter wall. A blower is in fluid communication with the inner conduit and ejects air into the inner conduit and outwardly of the exit aperture when the blower is actuated to an on position. A tube has a first end and a second end where the first end is fluidly coupled to the exit aperture. A refuse container is positioned under the second end of the tube. Articles positioned in the inner conduit and moved through the inner conduit and into the tube by the blower are ejected into the refuse container.

7 Claims, 5 Drawing Sheets

(56) References Cited

U.S. PATENT DOCUMENTS

2006/0153649 A1\* 7/2006 Folstadt ................ B65G 53/58
                                                                              406/144

\* cited by examiner

REFUSE DISPOSING SYSTEM

BACKGROUND OF THE DISCLOSURE

Field of the Disclosure

The disclosure relates to refuse disposal systems and more particularly pertains to a new refuse disposal system for assisting a person in moving recyclable materials into a recycling marked bin.

SUMMARY OF THE DISCLOSURE

An embodiment of the disclosure meets the needs presented above by generally comprising a housing having a perimeter wall bounding an interior space. An inner conduit is positioned within the housing. The perimeter wall has an access opening therein in communication with the inner conduit and the inner conduit has an exit aperture extending through the perimeter wall. A blower is in fluid communication with the inner conduit and ejects air into the inner conduit and outwardly of the exit aperture when the blower is actuated to an on position. A tube has a first end and a second end where the first end is fluidly coupled to the exit aperture. A refuse container is positioned under the second end of the tube. Articles positioned in the inner conduit and moved through the inner conduit and into the tube by the blower are ejected into the refuse container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
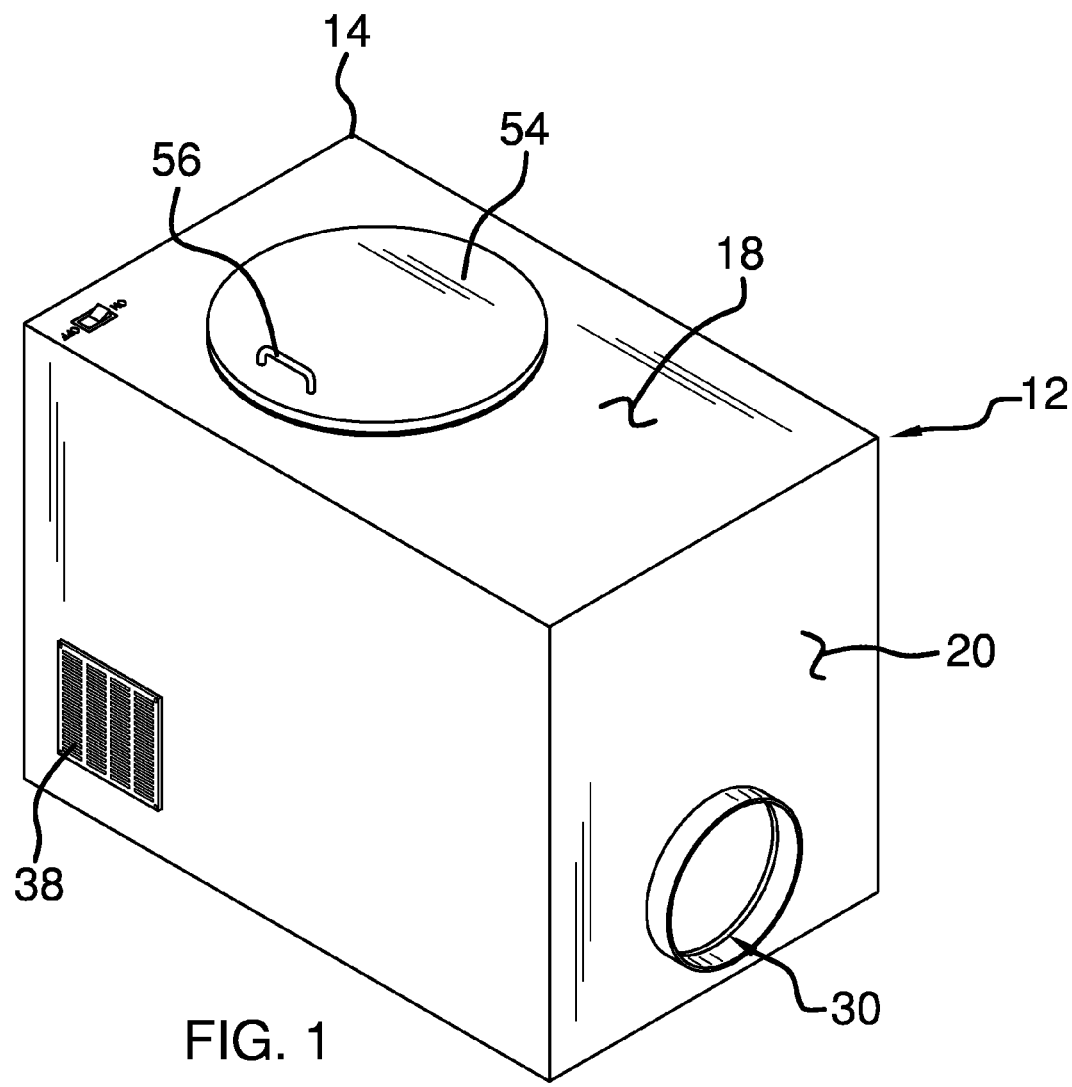
FIG. 1 is a top perspective view of a refuse disposing system according to an embodiment of the disclosure.
Figure 2:
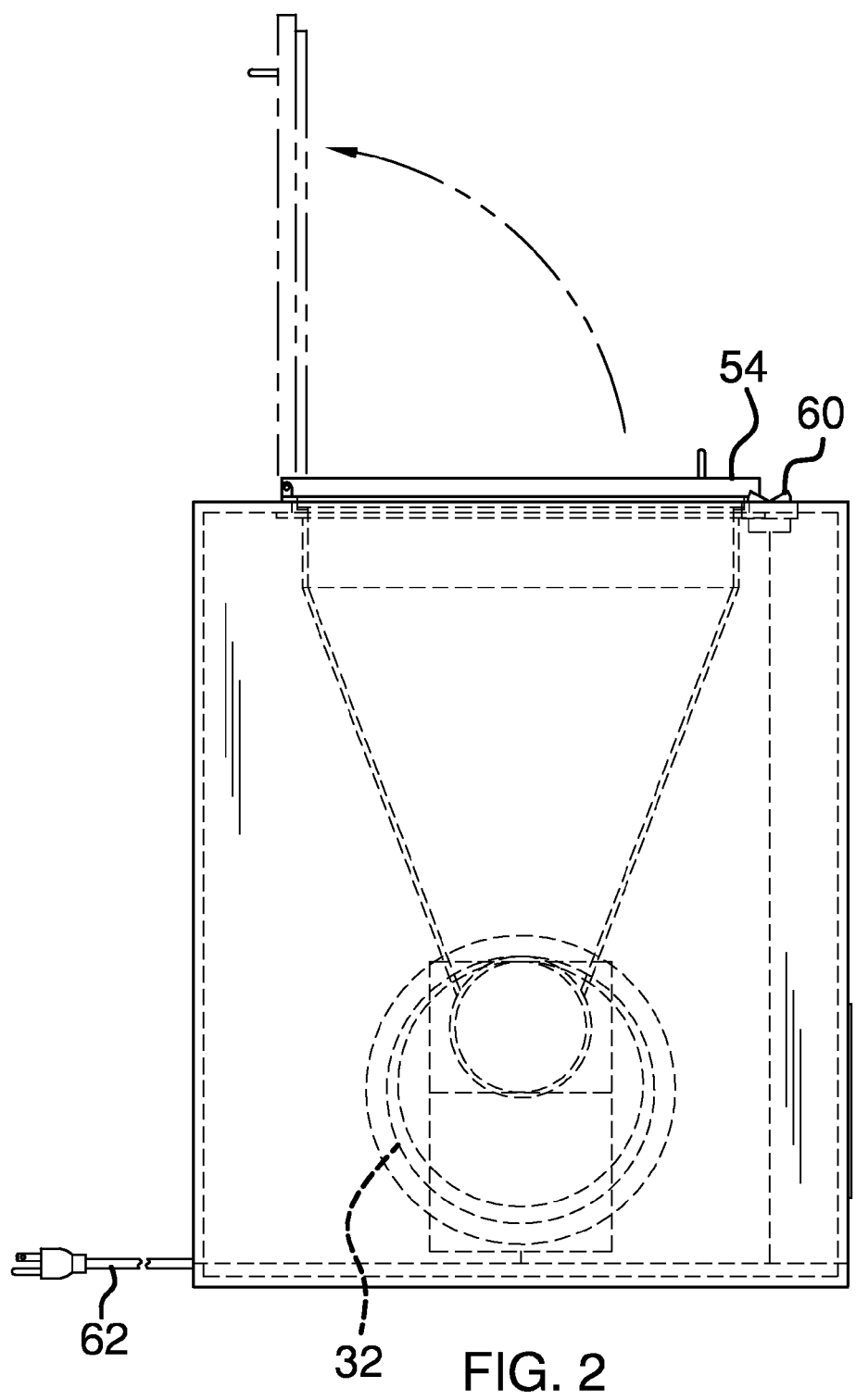
FIG. 2 is a rear view of an embodiment of the disclosure.
Figure 3:
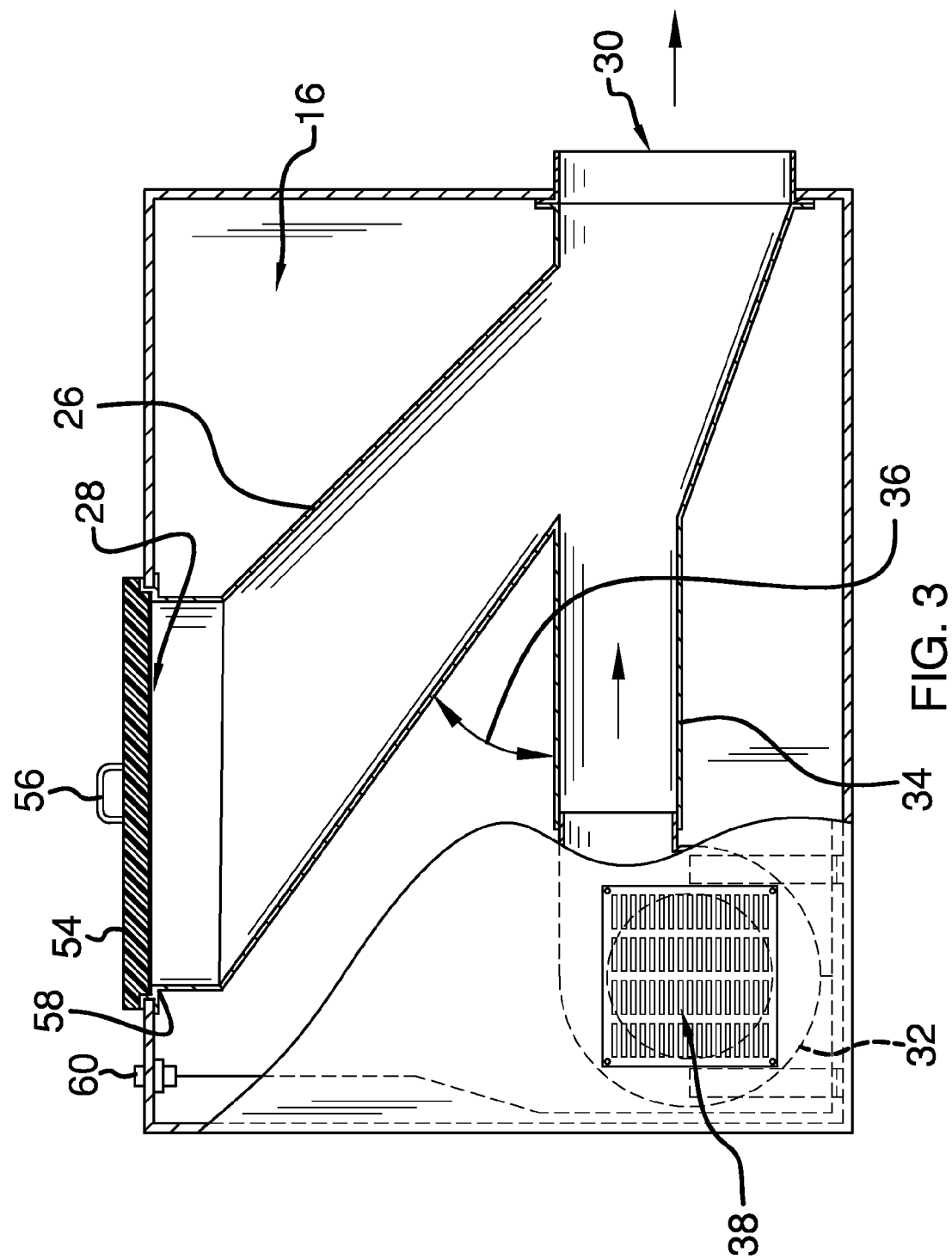
FIG. 3 is a broken side view of an embodiment of the disclosure.
Figure 4:
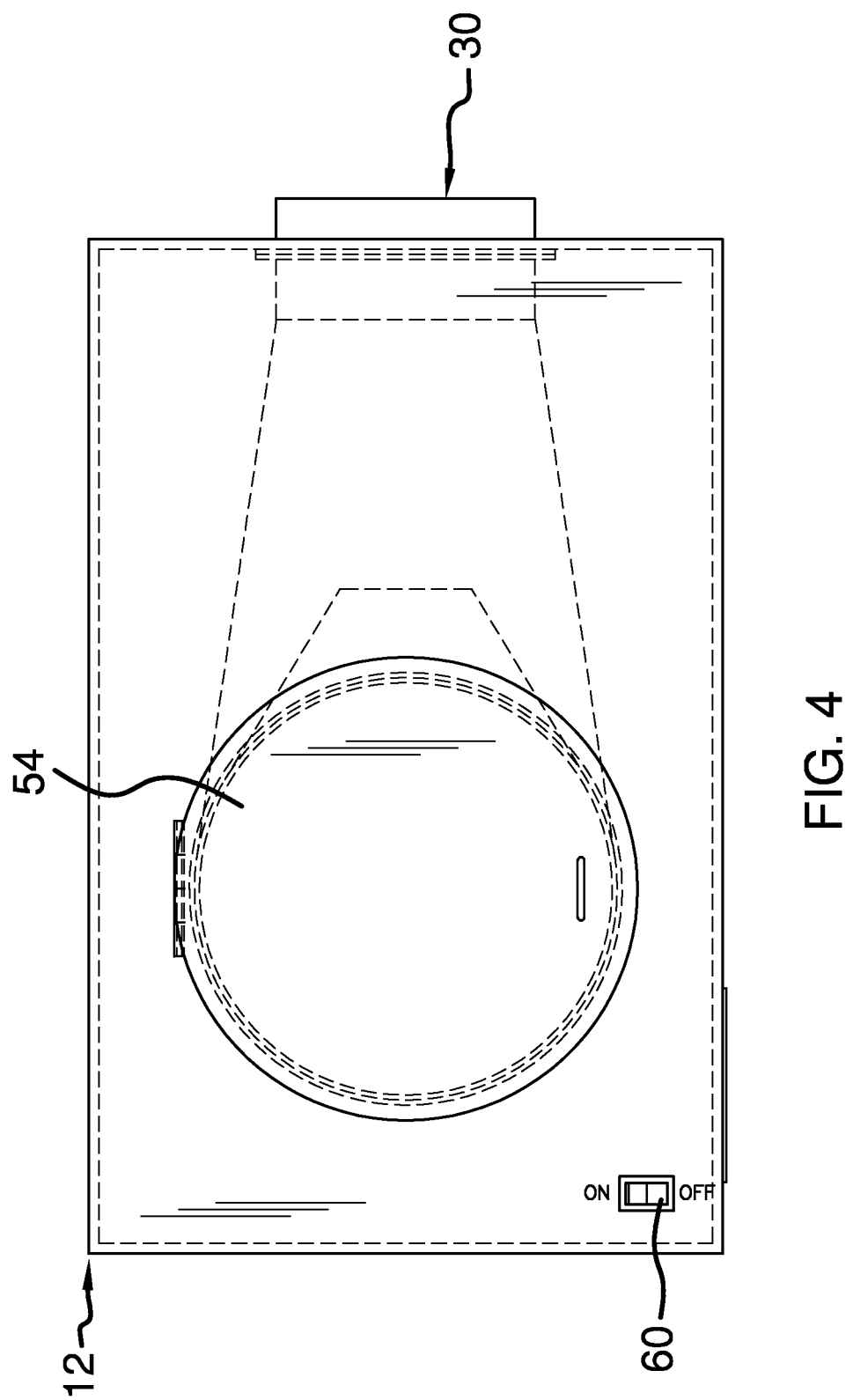
FIG. 4 is a top view of an embodiment of the disclosure.
Figure 5:
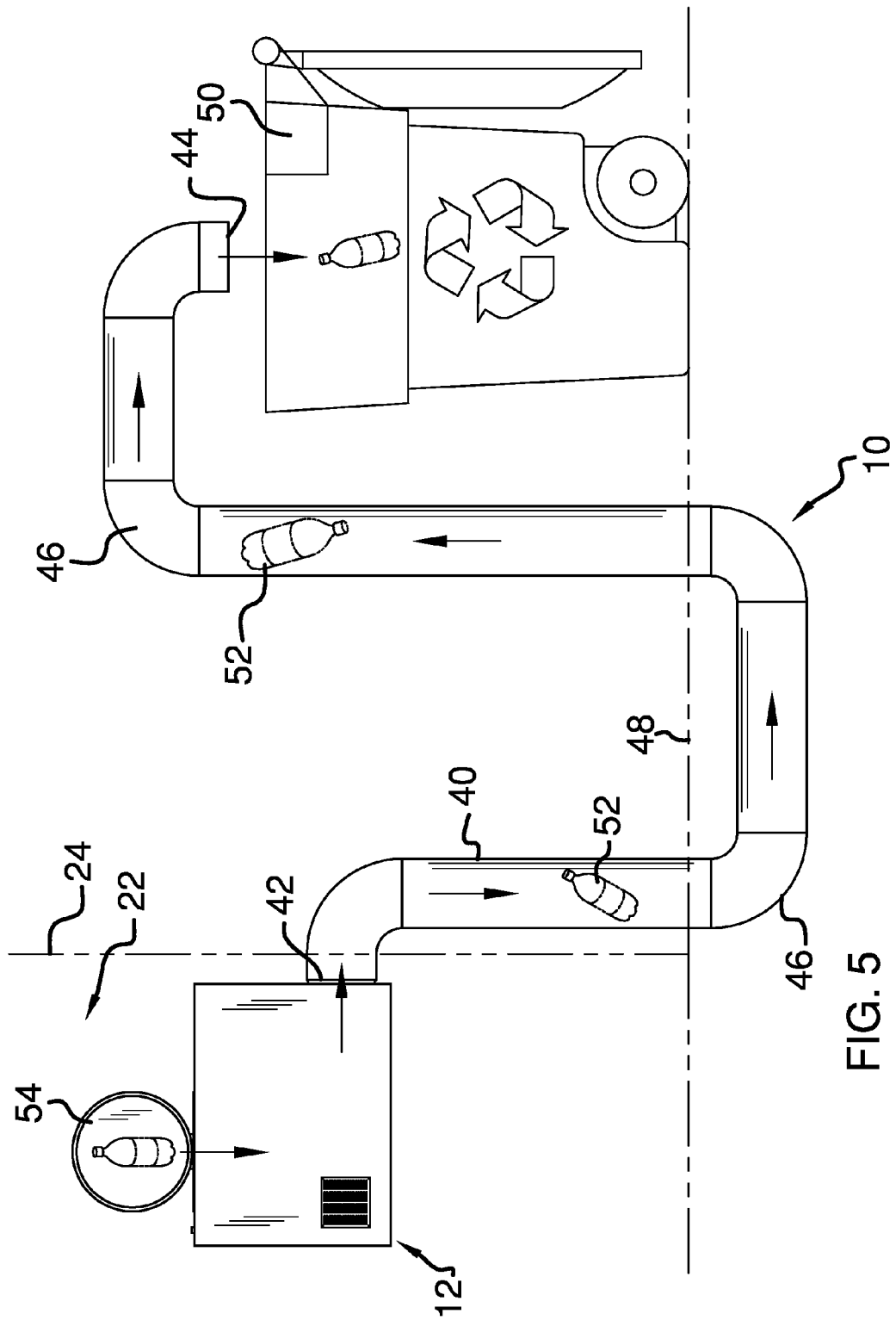
FIG. 5 is a side in-use view of an embodiment of the disclosure.

With reference now to the drawings, and in particular to FIGS. 1 through 5 thereof, a new refuse disposal system embodying the principles and concepts of an embodiment of the disclosure and generally designated by the reference numeral 10 will be described.

As best illustrated in FIGS. 1 through 5, the refuse disposing system 10 generally comprises a housing 12 that has a perimeter wall 14 bounding an interior space 16. The perimeter wall 12 includes an upper wall 18 and a peripheral wall 20 that is attached to and extends downwardly from the upper wall 18. The housing 12 will generally have a length, width and height each being less than 4.0 feet. The housing 12 has a size such that it is easily positionable within a dwelling 22, such as a house, having an outer wall 24, wherein the dwelling 22 is generally bounded by the outer wall 24.

An inner conduit 26 is positioned within the housing 12. The perimeter wall 14 has an access opening 28 therein in communication with the inner conduit 26 and the inner conduit 26 has an exit aperture 30 extending through the perimeter wall 14. The access opening 28 may be positioned in the upper wall 18 and the exit aperture 30 positioned in the peripheral wall 20. Generally, the access opening 28 will be positioned vertically higher than the exit aperture 30 and the inner conduit 26 may be angled downwardly from the access opening 28 to the exit aperture 30.

A blower 32 is in fluid communication with the inner conduit 26. The blower 32 ejects air into the inner conduit 26 and outwardly of the exit aperture 30 when the blower 32 is actuated to an on position. A blow tube 34 from the blower 32 to the inlet conduit 26 may form an acute angle 36 with a portion of the inlet conduit 26 extending between the blow tube 34 and the access opening 28. This will generally cause air to be forced from the blower 32 towards the exit aperture 30 and a straight line may be defined from the blower 32 to the exit aperture 30. The blower 32 may be positioned within the housing 12. An air inlet 38 extends through the perimeter wall 14 and is in fluid communication with the blower 32. The air inlet 38 may be positioned in the peripheral wall 20.

A tube 40 has a first end 42 and a second end 44 wherein the first end 42 is fluidly coupled to the exit aperture 30. The tube 40 extends through the dwelling 22 and outer wall 24 such that the second end 44 is positioned outside of the dwelling 22. The tube 40 may have one or more bends 46 therein and may extend under a ground surface 48 such that the tube 40 is generally hidden. The tube 40 may then be shaped such that the second end 44 is positioned between 3.0 feet and 6.0 feet of off the ground surface 48. The second end 44 is then directed downwardly towards a refuse container 50 positioned outside of the dwelling 22. In this manner, articles 52 positioned in the inner conduit 26 and moved through the inner conduit 26 and into the tube 40 by the blower 32 are ejected into the refuse container 50.

A cover 54 may be removably positioned on the housing 12 and is positionable in a closed position covering the access opening 28 or in an open position exposing the access opening 28. The cover 54 includes a handle 56 for more easily moving the cover 54. A gasket 58 is positioned between the cover 54 and a perimeter edge of the access opening 28 to better seal the cover 54 with respect to the access opening 28. An actuator 60 is operationally coupled to the blower 32 and is actuated to turn the blower 60 on or off. The blower 60 is electrically coupled to a conventional electric power source and may include an electrical cord 62 for electrically coupling the blower 32 to a wall outlet, though the blower 32 could be hardwired into a dwelling's electrical system.

In use, the housing 12 is placed within the dwelling 22 as stated above and may be hidden, such as within a cabinet or the like. When a person wishes to discard waste articles 52, the article 52 is dropped through the access opening 28 and the blower 32 turned on to cause the article 52 to move through the tube 40 and into the refuse container 50. The waste articles 52 may be that which can be recycled and the refuse container one which is specifically designed for collecting such recyclable waste. This will ensure that the user of the system 10 will more readily recycle such waste.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A waste disposal system comprising:
   a housing having a perimeter wall bounding an interior space;
   an inner conduit is positioned within said housing, said perimeter wall having an access opening therein in communication with said inner conduit, said inner conduit having an exit aperture extending through said perimeter wall;
   a blower being in fluid communication with said inner conduit, said blower ejecting air into said inner conduit and outwardly of said exit aperture when said blower is actuated to an on position;
   a tube having a first end and a second end, said first end being fluidly coupled to said exit aperture;
   a refuse container;
   said second end of said tube being positioned over said refuse container, wherein articles positioned in said inner conduit and moved through said inner conduit and into said tube by said blower are ejected into said refuse container; and
   a dwelling having an outer wall, said housing being positioned within said dwelling, said tube extending through said outer wall, said refuse container being positioned outside of said dwelling.

2. The waste disposal system according to claim 1, wherein said perimeter wall includes an upper wall and a peripheral wall being attached to and extending downwardly from said upper wall, said exit aperture being positioned in said peripheral wall, said access opening being positioned in said upper wall.

3. The waste disposal system according to claim 1, wherein said blower is positioned within said housing, an air inlet extending through said perimeter wall and being in fluid communication with said blower.

4. The waste disposal system according to claim 1, further including a cover being removably positioned on said housing and being positionable in a closed position covering said access opening or in an open position exposing said access opening.

5. The waste disposal system according to claim 4, further including a gasket being positioned between said cover and a perimeter edge of said access opening.

6. The waste disposal system according to claim 1, further including an actuator being operationally coupled to said blower and being actuated to turn said blower on or off.

7. A waste disposal system comprising:
   a housing having a perimeter wall bounding an interior space, said perimeter wall including an upper wall and a peripheral wall being attached to and extending downwardly from said upper wall;
   an inner conduit is positioned within said housing, said perimeter wall having an access opening therein in communication with said inner conduit, said inner conduit having an exit aperture extending through said perimeter wall, said access opening being positioned in said upper wall, said exit aperture being positioned in said peripheral wall;
   a blower being in fluid communication with said inner conduit, said blower ejecting air into said inner conduit and outwardly of said exit aperture when said blower is actuated to an on position, said blower being positioned within said housing, an air inlet extending through said perimeter wall and being in fluid communication with said blower, said air inlet being positioned in said peripheral wall;
   a dwelling having an outer wall, said housing being positioned within said dwelling;
   a tube having a first end and a second end, said first end being fluidly coupled to said exit aperture, said tube extending through said dwelling, said second end being positioned outside of said dwelling;
   a refuse container positioned outside of said dwelling;
   said second end of said tube being positioned over said refuse container, wherein articles positioned in said inner conduit and moved through said inner conduit and into said tube by said blower are ejected into said refuse container;
   a cover being removably positioned on said housing and being positionable in a closed position covering said access opening or in an open position exposing said access opening;
   a gasket being positioned between said cover and a perimeter edge of said access opening; and
   an actuator being operationally coupled to said blower and being actuated to turn said blower on or off.

* * * * *